United States Patent [19]

Schober

[11] 3,964,737

[45] June 22, 1976

[54] BELLEVILLE SPRING

[75] Inventor: Michael A. Schober, Palatine, Ill.

[73] Assignee: Borg-Warner Corporation, Chicago, Ill.

[22] Filed: Aug. 23, 1974

[21] Appl. No.: 500,212

[52] U.S. Cl. ............................................. 267/161
[51] Int. Cl.² ........................................... F16F 1/34
[58] Field of Search ........... 267/161, 162, 165, 134, 267/182; 148/148, 12.4, 16.5; 277/95

[56] References Cited
UNITED STATES PATENTS

| | | | |
|---|---|---|---|
| 3,259,383 | 7/1966 | Johnson et al. ...................... | 267/161 |
| 3,774,896 | 11/1973 | Rode .................................. | 267/161 |
| 3,901,739 | 8/1975 | Mandoki ............................. | 148/12.4 |

*Primary Examiner*—James B. Marbert
*Attorney, Agent, or Firm*—James A. Geppert

[57] ABSTRACT

A washer-type spring, commonly called a Belleville spring, which has an improved fatigue life and residual compressive stresses resulting from the creation of a carbon gradient through the spring thickness. This improved spring is formed from a plain carbon or low alloy steel which, after blanking, cutting and forming, is heated to a temperature above the austenitizing temperature in a carbon-rich atmosphere, held at this temperature until suitably carburized, and then quenched.

6 Claims, No Drawings

BELLEVILLE SPRING

BACKGROUND OF THE INVENTION

The present invention relates to an improved washer-type or Belleville spring, and more particularly to a Belleville spring having an improved fatigue life and surface residual compressive stresses.

Springs of the Belleville type have been employed in friction clutches and similar mechanical applications, such springs having a conical or roughly conical shape with an inner periphery which is normally spaced axially from the plane of the outer spring periphery and approaches that plane as the spring is placed under compression.

Presently known Belleville springs are formed of a plain carbon steel with standard alloy additions and a carbon content of about 0.60 to 1.00% in a cold rolled sheet or strip. To form a Belleville spring from this raw material, the basic shape of the spring is stamped or punched out of the steel strip and press formed into a truncated cone shape. After stamping and forming, the spring is heat treated at a temperature in the range of from about 1,400° to 2,000°F. and subsequently quenched in oil, water, salt or air to a temperature in the range of from about room temperature to 400°F. This quenching may be followed by additional heating and cooling steps for tempering to relieve distortions in the material caused by quenching, to obtain the desired hardness and to set the spring to final shape.

This present production sequence is costly and requires additional preliminary operations due to the quality of the material utilized. The production of the high carbon, coldrolled sheet or strip steel is costly because the initial high carbon content results in a high strength and a strain hardening coefficient of the steel which necessitates multiple annealing and pickling operations during rolling of the raw material to final thickness. Also, the forces to stamp or punch out the basic spring shape are high due to the elevated strength of the high carbon steel which requires very strong and wear resistant dies.

Due to the rapid strain hardening of high carbon material, the edges of the stamped parts can become very brittle unless special precautions are taken. This brittleness may result in minute cracks at the edges which have to be removed by costly and time consuming methods, such as tumbling, grinding or the like, in order to avoid deleterious effects on the performance, particularly the fatigue life, of the finished Belleville springs. Similarly, the forming of the cone configuration of the Belleville spring in special dies may lead to the formation of sub-microscopic cracks in the high carbon, easily embrittled material.

The basic standard material used for the production of Belleville springs does not have a deliberately produced carbon gradient, but usually has a lower surface carbon content due to decarburization during the rolling and annealing operations of the raw material. The level of carbon determines the transformation temperature at which austenite transforms into martensite; the desired final structure. Thus, if the carbon level at the surface of the spring is less than the internal carbon level, the transformation temperature of the surface of the spring would be in a higher range than the transformation temperature range of the core. During quenching, a temperature gradient is produced in the Belleville spring resulting in a significantly lower surface temperature compared with the core temperature. This temperature gradient depends on the thickness and geometry of the material, but it can never be reversed during quenching. As a consequence of the inadvertently produced carbon gradient in the standard spring material and the temperature gradient during quenching, the surface of the belleville spring will transform into martensite earlier than the core.

The transformation of austenite into martensite results in a volume increase in the metal of 3% to 4%. Further, the resulting martensite structure is very strong but also extremely brittle as compared to austenite, which is fairly ductile. Consequently, during quenching, a very hard brittle layer of martensite will form on the surface of the spring so treated while the core is still in the austenitic state. The stresses set up during the transformation of the surface due to the volume increase will compress the core and deform the relatively ductile austenite therein. As soon as the core reaches the transformation temperature, it will be transformed into martensite and try to expand in volume against the resistance of the previously formed martensitic surface "shell".

This process obviously creates extremely high tensile stresses in the surface shell and leads to the generation of high residual tensile stresses therein. Very frequently, these tensile stresses become so high that the surface shell is cracked or even broken. Weaknesses or cracks so produced in the surface shell cannot be repaired by any known means; however, they can be camouflaged and to a certain extent counteracted by subsequent cold working of the spring surface by methods such as shot peening, vibratory finishing, ball peening, rolling, etc. In consequence of the above considered standard production sequence for presently manufactured Belleville springs, these springs have an inherent weakness resulting from the carbon and temperature distribution during quenching; this inherent weakness resulting in a comparatively low fatigue life.

SUMMARY OF THE INVENTION

The present invention relates to an improved process for the manufacture of Belleville springs which attempts to overcome the inherent weakness of prior springs resulting from the standard materials used and the heat treatment thereof, as well as to lead to a reduction in raw material and tooling costs. Also, the present process is simpler and less prone to error than previous methods. The raw material utilized in the present process is a low to medium carbon steel resulting in a lower carbon content and greater ductility of the raw material; the lower carbon content reducing the strain hardening coefficient. As a consequence, the raw material is less costly to produce as it requires fewer annealing and rolling steps.

The raw material also requires less force during stamping and forming operations, thus reducing the need for very strong and costly dies. Alternatively, if strong and expensive dies are utilized, they would have an appreciably longer life, thus contributing to lower die cost. Since the raw material is not as susceptible to embrittlement, the danger of damaging the spring edges during stamping and forming by producing minute cracks is also reduced. This would lead to further cost reduction by eliminating the need for edge refinement procedures, like tumbling, grinding, coining, etc.

The present invention also comprehends the provision of an improved heat treatment for the formed spring to provide the deliberate formation of a carbon gradient in the spring by use of a carburizing treatment stage; for example, gas carburization having a carbon potential of 0.7% to 1.2% for such suitable times and temperatures as determined by the case depth requirements. As a result of this treatment, the spring surface will have a higher carbon content than the core, resulting in a lower transformation temperature at the surface than for the core. Despite the temperature gradients set up during quenching, the carbon gradient will now permit the transformation of the spring core to martensite prior to the transformation of the spring surface with an appropriately controlled quench medium and temperature.

The present invention further comprehends the provision of an improved Belleville spring having a higher fatigue life and a surface of high integrity with no inadvertently produced cracking or weakening. Thus, there is no necessity to cover up or counteract damage from previous processing steps. As the core of the spring is initially transformed to martensite followed by the transformation of the surface or shell during quenching, the expansion of the surface shell is restrained by the rigid martensitic core and high residual compressive stresses will be produced in the surface to effectively prevent the formation of quench cracks or breakage of the shell.

Other objects and advantages of the present invention will be apparent from the following detailed description of the preferred embodiments thereof.

DESCRIPTION OF THE PREFERRED EMBODIMENT

The present invention relates to an improved washer-type or Belleville spring and to the method of heat treating the formed spring to provide the improved characteristics therefor. Belleville springs are commonly used in friction clutches, and smaller sizes of these springs may be used singly or in a stack for the biasing of parts in a limited slip differential or other structures. A Belleville spring is roughly conical and has an outer periphery and an inner periphery defining a central opening through the spring. The conical spring is truncated to provide the inner periphery spaced a distance from the plane of the outer periphery along the central axis of the spring; such a spring being shown in the Belleville U.S. Pat. No. 65,790.

Belleville springs at present are usually made of a plain carbon or low alloy steel having an original carbon content of 0.6 to 1.0% carbon. These materials have to be specially prepared by such operations as double annealing and spheroidizing to facilitate the blanking, cutting, forming and similar operations. The subsequent hardening is accomplished by heating the material to a temperature above the austenitizing temperature in a neutral atmosphere and quenching. As previously discussed, the use of this material and process results in a spring having inherent weaknesses that lead to early failure in use.

The process of the present invention differs from the above procedure in starting with a raw material in the form of a low to medium carbon steel having a carbon content of 0.2 to 0.4%. After the raw material is blanked, cut and formed to the basic spring shape, the spring is heated to a temperature above the austenitizing temperature in an atmosphere having a carbon potential of 0.60 to 1.20% carbon and held at this temperature until a carbon-rich case has been formed by diffusion of carbon into the steel. The case depth can be varied, with the desired limits falling between 0.010 inch and through carburization, and controlled by the time the material is held at the carburizing condition. Subsequently, the material is quenched.

The use of the lower carbon content steel results in a material having a low strength, greater ductility and a low strain hardening coefficient. As a result of the carburization during heating above the austenitizing temperature, the surface of the spring will have a carbon content in the range of 0.7 to 1.0% and an associated transformation temperature in the range of from 200°F. to 500°F, while the spring core will retain the carbon content of the base material, typically 0.2 to 0.4% with an associated transformation temperature in the range of from 600° to 900°F.

Despite the temperature gradients set up during quenching, the carbon gradient in the material will permit the transformation of the core to martensite prior to transformation of the spring surface, if the quench medium and its temperature is appropriately controlled.

As an example, an oil quench in a temperature range of from 250° to 350°F. is utilized, with the result that the core undergoes transformation and associated volume expansion while the surface is still in the austenitic state; which will allow for a deformation of the surface layers without damaging them because austenite is highly ductile and pliable. Thus, when the core expands upon its transformation to martensite, the surface layer is not damaged by this expansion. Subsequently, when the surface layer transforms to martensite, it will try to expand against the resistance of the, by now, very strong and rigid martensitic core. Since it is restrained by this core, high residual compressive stresses will be produced within the surface shell making the formation of quench cracks or breakage of the surface shell virtually impossible.

The magnitude of these residual compressive stresses in the shell should correspond ideally to about 80% of the yield strength of the material, but such stress is not extremely significant as long as no link of the crystalline chain constituting this shell is exposed to tensile stresses during transformation to martensite. This method provides a spring with a surface of high integrity having no inadvertently produced cracking or weakening. Subsequent cold working of this surface by shot peening or other conventional methods can improve the surface quality of the spring, however, these steps are not necessary to cover up or counteract damage from previous processing steps. As a result of this heat treatment, and the inherently better springs produced this way, the fatigue life of the springs is significantly higher than for springs produced by presently known conventional methods.

After the spring has been carburized and quenched, it may be suitably tempered in conventional manner by heating to a temperature in the range of 400° to 800°F. for a suitable period and then cooled to relieve quenching distortion or other undesirable stresses, to produce the required hardness and to set the spring.

The heat treatment of the formed spring is in the range of from 1,500° to 2,000°F. for a time period of from 15 minutes to 4 hours. The quenching medium is an oil bath at a temperature in the range of 250° to 350°F. As a result, the fatigue life of the spring treated by the present method improved approximately 100 to 200% over presently known Belleville springs; with surface residual compressive stresses in the range of −70,000 to −80,000 per square inch (psi.) as opposed to residual tensile stresses of from +20,000 to +40,000 psi. for conventionally formed Belleville springs.

The following examples more specifically illustrate the improved process and resulting spring:

EXAMPLE I

Springs formed of an SAE 1035 steel base material were carburized for one hour at 1,700°F. and a 0.70% carbon potential atmosphere in a carburizing furnace and quenched in oil. The resulting spring had a surface carbon content of approximately 0.70% carbon, a case depth of approximately 0.015 inches, and a core carbon content of about 0.35% carbon. The treatment increased the characteristic fatigue life ($B_{63.2}$) of the springs in the range of 127% to 236% compared to springs formed by the above-described standard procedure.

EXAMPLE II

Springs formed of a SAE 1035 steel base material were carburized for four hours at 1,700°F. and a 0.70% carbon potential atmosphere in a carburizing furnace, and oil quenched; which resulted in a spring having a surface carbon content of approximately 0.7% carbon, a case depth of approximately 0.040 inches and a core carbon content of about 0.35% carbon. The treatment increased the characteristic fatigue life ($B_{63.2}$) of the spring by an amount in the range of 94% to 187% by comparison with springs formed by the standard procedure.

EXAMPLE III

Materials analogous to SAE 1035 spring steel base material, such as a SAE 1020 steel, were carburized in a two-stage operation in a carburizing furnace at a temperature of about 1,700°F. The first stage was in an atmosphere having a carbon potential of 1.20% carbon for approximately 20 minutes and, in the second stage, the carbon potential was reduced to about 0.75% carbon for an additional 20 minutes. After quenching in oil at about 250°F., the material had a case depth of approximately 0.02 inches with a surface carbon content of about 0.75% carbon and a core carbon content equal to that of the base material (e.g. 0.20 to 0.27% carbon). The effect of this treatment version is a significant speed-up of the processing.

EXAMPLE IV

Materials analogous to SAE 1035 spring steel base material, such as SAE 1020 steel, were carburized in a furnace in a two-stage operation at approximately 1,800°F. The first stage was for a time interval of 10 minutes at a carbon potential atmosphere of 1.20% carbon, and the second stage was for an additional 10 minutes at a carbon potential of 0.70% carbon. The results of this test substantially conform to those of Example III.

From these last two examples, for a two-stage carburizing operation, it can be seen that each increase of approximately 100°F. in the carburizing temperature results in a reduction of approximately 50% of the treatment time required for carburizing. This relationship is effective up to approximately 50°F. below the melting temperature of the material treated.

The desired case depth effective hardness is 50 Rockwell C at a depth of 0.02 to 0.025 inches, while the hardness at the spring surface is in the range of 57–60 Rockwell C. When the spring is tempered after quenching, the overall hardness will drop to approximately 47 Rockwell C. The average residual compressive stress at the surface of the improved springs is −70,000 psi. compared to an average residual tensile stress of +20,000 psi. for conventionally formed springs.

The following table discloses detailed test results relating to the fatigue life of conventionally formed springs and springs treated by the process of the present invention.

Table I

| Type Spring | Life Cycles × $10^3$ | | |
|---|---|---|---|
| | $B_{10}$ | $B_{50}$ | $B_{63.2}$ |
| Representative average of 5 groups of std. production springs (tested during period of 1967–1969) | 31.5 (26.5 to 55.5) | 49.6 (46.0 to 72.3) | 55.1 (51.5 to 76.2) |
| Carburized (0.020) | 64.5 | 143.3 | 172.9 |
| Carburized (through) | 87.7 | 136.0 | 148.0 |

The above figures were arrived at by the Weibull method of statistical analysis and represent the characteristic lives of the springs tested at a constant load amplitude. These results illustrate the improved fatigue life of the carburized springs with the headings of $B_{10}$, $B_{50}$ and $B_{63.2}$ representing points on the statistical curve. Of these, the $B_{63.2}$ figures are the most significant relative to the fatigue life of springs treated by the process of the present invention.

From these tests, it has been found that the optimum fatigue life is provided by the case hardening or carburizing of the formed Belleville springs to a depth in the range of 0.010 to 0.025 inches, regardless of the spring section thickness. The springs made by the present method have an approximately 0.070 inches material thickness, with case hardening to a depth of 0.040 inches providing a through case hardening. Standard springs have a normal thickness of approximately 0.074 inches. It has further been found that a carburizing temperature toward the high end of the temperature range of 1,500° to 2,000°F. is more economical for the process, and the time of carburizing and the temperature therefor are inversely proportional.

I claim:

1. An improved Belleville spring formed of a low carbon steel having an original carbon content not higher than 0.40% carbon and provided with a case hardened surface to a depth in the range of 0.010 to 0.040 inches and having residual compressive stresses in the surface of the spring, said spring surface having a carbon content of at least approximately twice the carbon content at the core of the spring.

2. An improved Belleville spring as set forth in claim 1, in which the residual compressive stresses are in the range of −70,000 to −80,000 psi.

3. An improved Belleville spring as set forth in claim 2, in which the fatigue life of the spring is improved in the range of 100 to 300%.

4. An improved Belleville spring as set forth in claim 1, in which said case hardened surface is formed by carburization in an atmosphere having a carbon potential of 0.60 to 1.20% carbon and subsequent quenching.

5. An improved Belleville spring as set forth in claim 1, in which said case hardened depth is in the range of from 0.010 to 0.025 inches.

6. An improved Belleville spring as set forth in claim 1, in which the raw material for the spring has an original carbon content of approximately 0.20 to 0.40% carbon, and the case hardened spring has a surface carbon content of approximately 0.75% carbon, a core carbon content of approximately 0.35% carbon and an effective case hardened depth of about 0.020 inches.

* * * * *